US012418140B2

(12) United States Patent
Kanno

(10) Patent No.: US 12,418,140 B2
(45) Date of Patent: Sep. 16, 2025

(54) CONNECTOR HAVING A HOOD FOR PROTECTING A CABLE PULL-OUT PORTION

(71) Applicant: JAPAN AVIATION ELECTRONICS INDUSTRY, LIMITED, Tokyo (JP)

(72) Inventor: Hideyuki Kanno, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 302 days.

(21) Appl. No.: 18/225,337

(22) Filed: Jul. 24, 2023

(65) Prior Publication Data

US 2024/0039209 A1 Feb. 1, 2024

(30) Foreign Application Priority Data

Jul. 28, 2022 (JP) ................................. 2022-120363

(51) Int. Cl.

*H01R 13/56* (2006.01)
*H01R 13/506* (2006.01)
*H01R 13/52* (2006.01)
*H01R 13/58* (2006.01)

(52) U.S. Cl.

CPC ........... *H01R 13/56* (2013.01); *H01R 13/506* (2013.01); *H01R 13/5213* (2013.01); *H01R 13/5841* (2013.01)

(58) Field of Classification Search

None

See application file for complete search history.

(56) References Cited

U.S. PATENT DOCUMENTS 4,549,780 A * 10/1985 Bertini ................. H01R 13/595 439/468
5,211,706 A 5/1993 Polgar
5,586,916 A 12/1996 Shinji et al.
5,910,026 A * 6/1999 Geib .................... H01R 13/506 439/471
2015/0024624 A1* 1/2015 Monagle ............ H01R 13/5841 439/534

FOREIGN PATENT DOCUMENTS

EP 1555726 7/2005
JP 2016-195011 A 11/2016

OTHER PUBLICATIONS

Extended European Search Report Issued in Corresponding EP Patent Application No. 23187716.8, dated Dec. 11, 2023.

* cited by examiner

*Primary Examiner* — Oscar C Jimenez
(74) *Attorney, Agent, or Firm* — GREENBLUM & BERNSTEIN, P.L.C.

(57) ABSTRACT

A module is composed of a terminal that is attached to a cable and an insulator that accommodates the terminal. The insulator includes two spring pieces and two protrusions that are formed on the two respective spring pieces. A housing has through holes on mutually opposed positions on respective side walls surrounding an accommodation space. The module is accommodated in the accommodation space in a manner such that the two protrusions thereof are fitted from an inside into the respective through holes. A hood is composed of two split bodies. The hood can be fixed on the housing in a manner such that projecting portions of the split bodies are fitted from an outside into the respective through holes and the two split bodies are coupled to each other with a coupling means.

6 Claims, 8 Drawing Sheets

CONNECTOR HAVING A HOOD FOR PROTECTING A CABLE PULL-OUT PORTION

TECHNICAL FIELD

The present invention relates to a connector that includes a hood for protecting a cable pull-out portion.

BACKGROUND ART

FIGS. 1 and 2 illustrate a configuration described in Japanese Patent Application Laid Open No. 2016-195011 as a related art example of the configuration in which a hood (connector hood) is attached to a connector. In FIG. 1, 10 denotes a hood and 13 denotes a cable. Further, 20 denotes a mass flow controller (MFC) to which the connector is connected.

FIG. 2 illustrates an internal structure of the hood 10 of FIG. 1. The hood 10 is connected to a connector terminal 11 provided on an upper surface of the MFC 20. The hood 10 includes a first member 1, a second member 2, a third member 3 (see FIG. 1, illustration is omitted in FIG. 2), a fourth member 4 including an opening for the connector terminal 11, side surface screw 5, and upper surface screw 6. The side surface screw 5 serve to couple the first to fourth members 1 to 4 and the like to each other, and the upper surface screw 6 serve to fix the connector terminal 11 held by the hood 10 to the MFC 20.

The connector terminal 11, wires 12, the cable 13, and a bushing 14 are contained in the inside of the hood 10, and the wires 12 are connected to respective pins of the connector terminal 11.

The above-mentioned configuration of the related art uses screws for attaching and fixing a hood and accordingly requires forming the screw holes for the screws in a fixing target (the MFC 20 in the above-mentioned example) of the hood. That is, related art configurations have required an additional work for forming special screw holes in the fixing target for attaching and fixing the hood.

BRIEF SUMMARY OF THE INVENTION

An object of the present invention is to provide a connector that includes a hood which can be attached without a special means that is additionally required for attaching the hood.

According to the present invention, a connector includes a housing, a module, and a hood. The module is composed of a terminal, which is attached to an end of a cable and connected with a mating terminal of a mating connector, and an insulator which accommodates and holds the terminal. The insulator includes two spring pieces, which are formed on respective outer surfaces that are positioned on mutually opposite sides, and two protrusions, which are formed on the two spring pieces respectively in a manner to protrude mutually outward. The housing has an accommodation space and a through hole is formed on each of mutually opposed positions on respective side walls surrounding the accommodation space. The module is positioned and accommodated in the accommodation space to be attached to the housing in a manner such that each of the two protrusions is fitted from an inside into the through hole, which is formed on each of the mutually opposed positions on the side walls. The hood is composed of two split bodies that can be separated from and joined to each other, and a projecting portion is formed on each of the two split bodies.

The hood can be positioned and fixed on the housing in a manner such that the projecting portion of each of the two split bodies is fitted from an outside into the through hole, which is formed on each of the mutually opposed positions on the side walls, and the two split bodies are coupled to each other with a coupling means. When a connecting direction between the terminal and the mating terminal is defined as an up and down direction, the two split bodies have respective shapes to form a straight pull-out hole through which the cable can be pulled out from the hood upward and form an angle pull-out hole through which the cable can be pulled out from the hood in a direction orthogonal to the up and down direction, in a state in which the hood is positioned and fixed on the housing.

Effects of the Invention

According to the present invention, it is possible to obtain a connector that includes a hood which can be easily attached without newly requiring a special means for attaching the hood.

LIST OF REFERENCE NUMERALS

Figure 1:
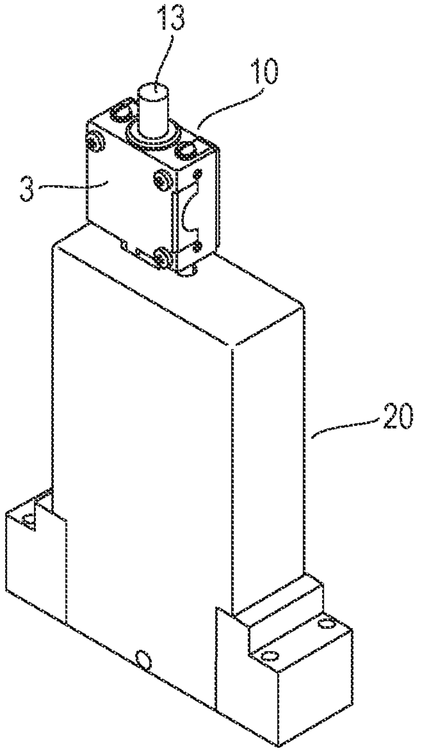
FIG. 1 (PRIOR ART)
FIG. 1 is a perspective view illustrating a related art configuration in which a hood is attached to a connector.
Figure 2:
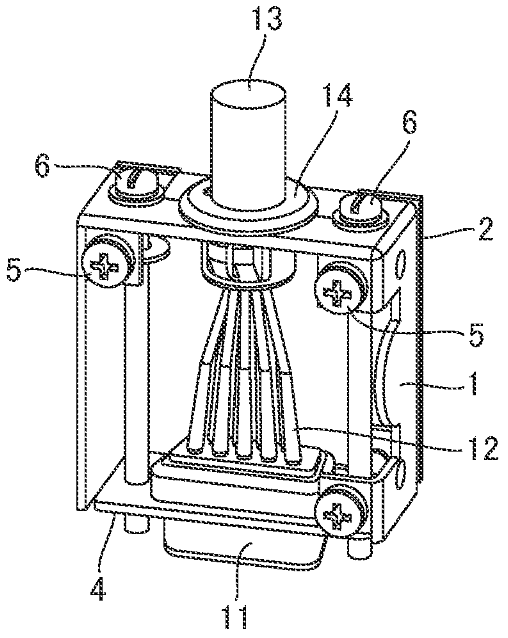
FIG. 2 (PRIOR ART)
FIG. 2 is a perspective view illustrating chief-component internal structure of FIG. 1.

- 1: first member
- 2: second member
- 3: third member
- 4: fourth member
- 5: side surface screw
- 6: upper surface screw
- 10: hood
- 11: connector terminal
- 12: wire
- 13: cable
- 14: bushing
- 20: MFC
- 30: housing
- 31: accommodation space
- 32: side wall
- 33: side wall
- 34: side wall
- 35: side wall

36: through hole
37: lever
40: module
41: terminal
41*a*: cut-and-raised piece
42: insulator
43: attaching hole
43*a*: step portion
44: spring piece
44*a*: protruding portion
44*b*: protrusion
50: hood
51: straight lead-out hole
60: split body
61: side surface plate portion
62: upper surface plate portion
63: front surface plate portion
63*a*: inclined portion
64: back surface plate portion
65: cutout
66: cutout
67: projecting portion
68: bundling-band threading hole
69: fixing portion
70: split body
71: side surface plate portion
72: upper surface plate portion
73: front surface plate portion
73*a*: inclined portion
74: back surface plate portion
75: cutout
76: cutout
77: projecting portion
78: bundling-band threading hole
79: fixing portion
80: bundling band
90: grommet
100: connector
200: cable
201: core wire

DETAILED DESCRIPTION

An embodiment of the present invention will be described based on an example with reference to the accompanying drawings.

Figure 3A:
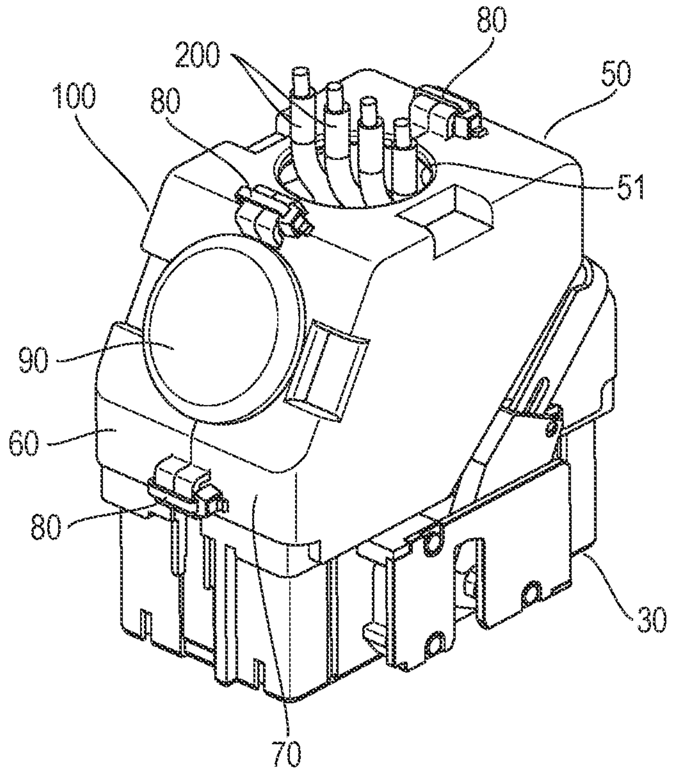
FIG. 3A is a front perspective view illustrating an example of a connector according to the present invention.
Figure 3B:
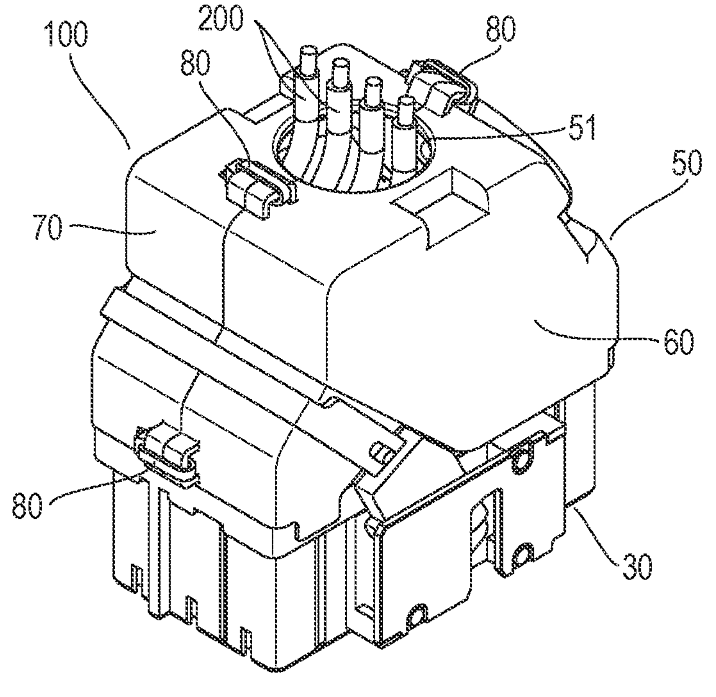
FIG. 3B is a rear perspective view illustrating the example of the connector according to the present invention.
Figure 4:
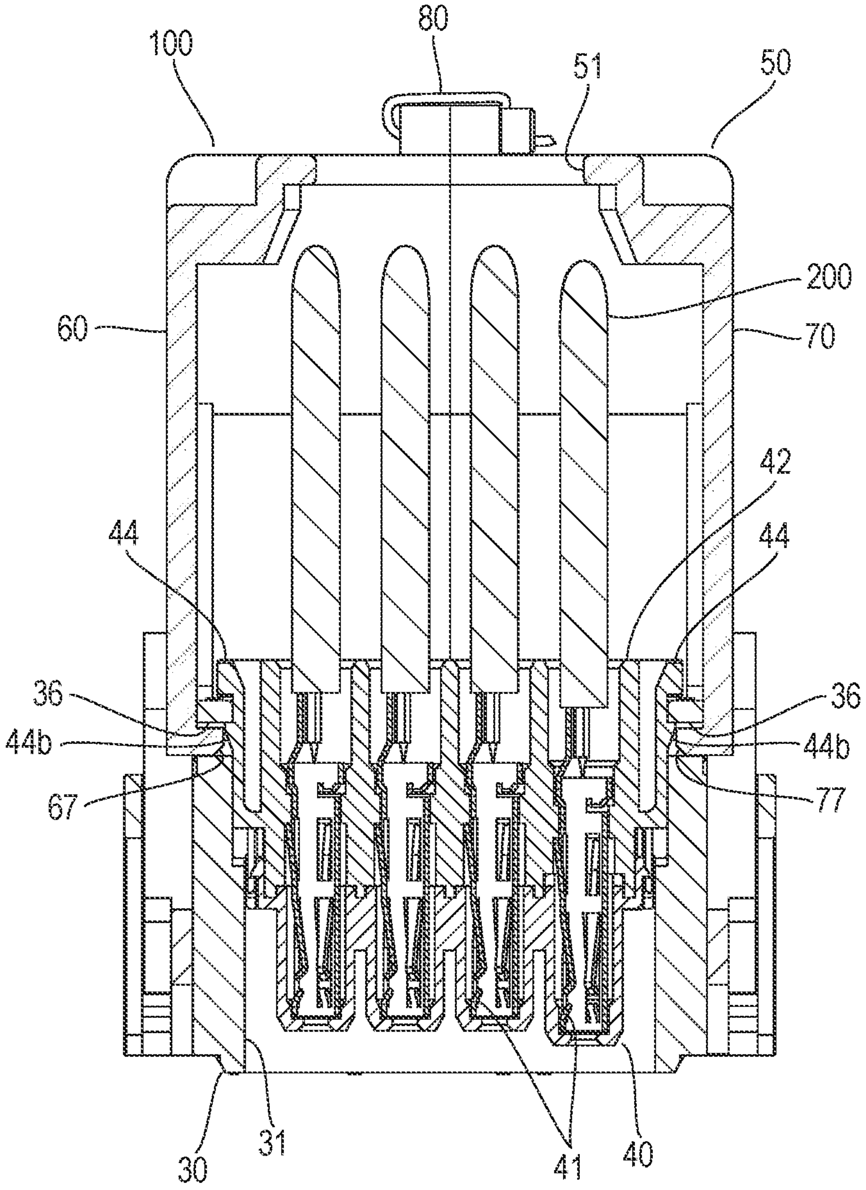
FIG. 4 is a longitudinal sectional view of the connector illustrated in FIG. 3A.

FIGS. 3A and 3B illustrate an outer appearance of an example of a connector according to the present invention, and FIG. 4 illustrates a cross-sectional structure of the connector. A connector 100 in this example is configured to include a housing 30, modules 40, and a hood 50. Here, in FIGS. 3A, 3B, and 4, 200 denotes cables connected to the connector 100, and the cables 200 are only partially illustrated in this example, with the entire illustration thereof omitted.

Figure 5:
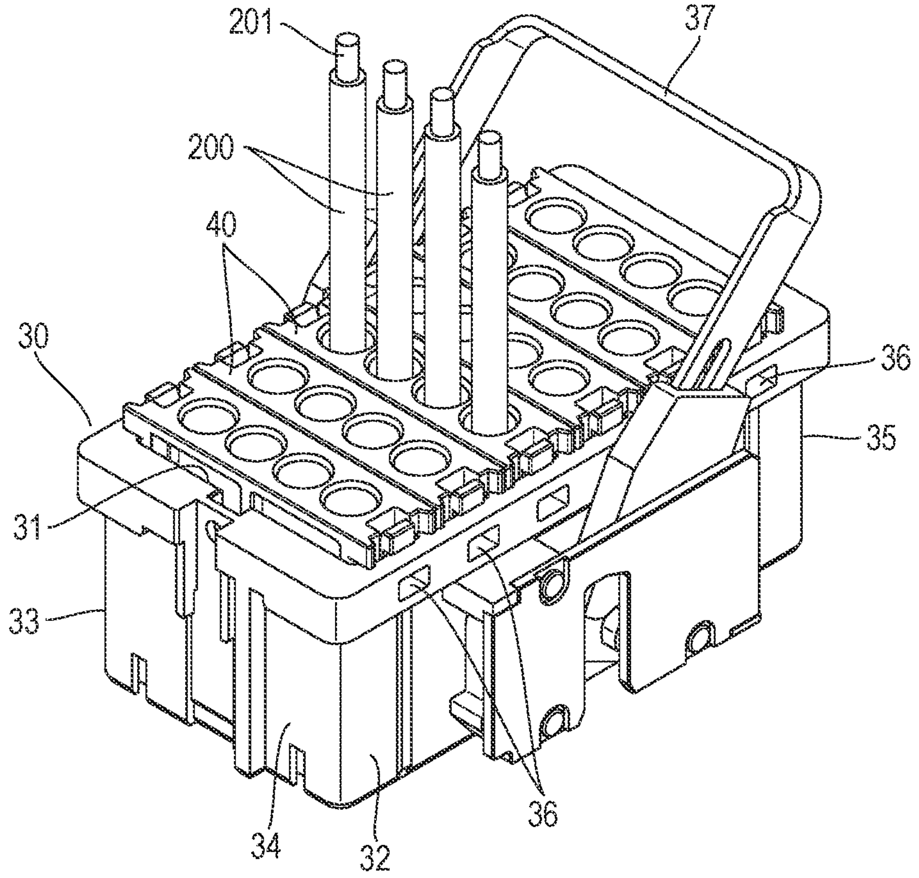
FIG. 5 is a perspective view illustrating a state in which a hood is removed from the connector illustrated in FIG. 3A.
Figure 6:
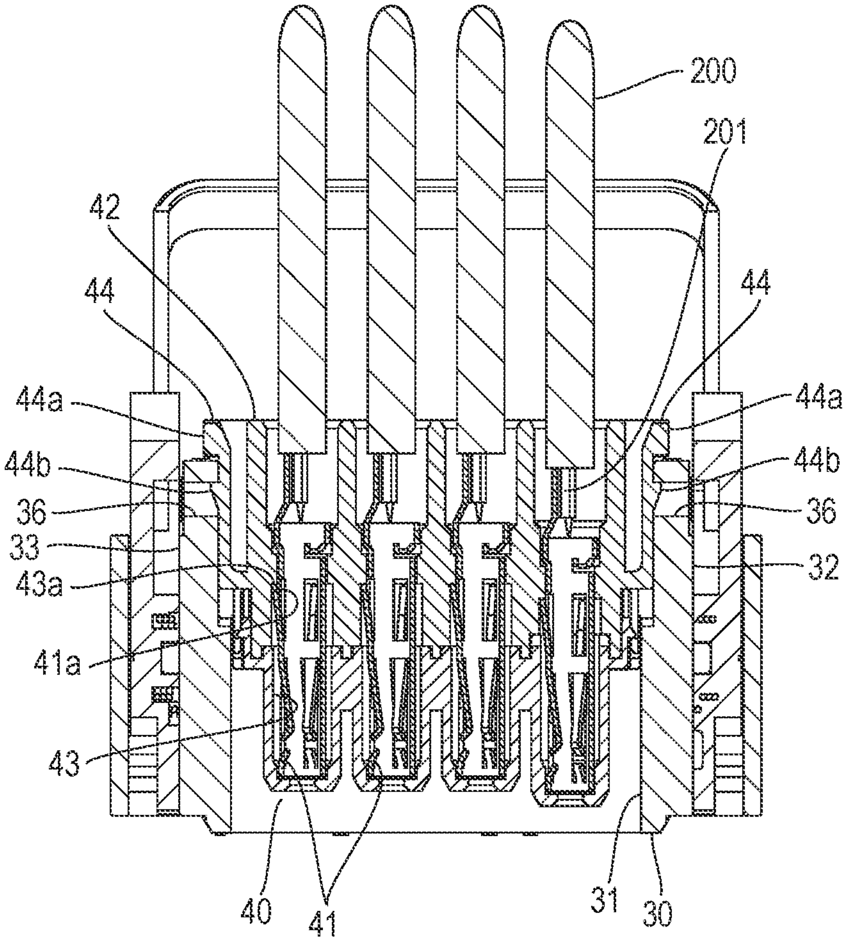
FIG. 6 is a longitudinal sectional view of the state illustrated in FIG.

FIG. 5 illustrates a state in which the hood 50 is removed from the connector 100, and FIG. 6 illustrates a cross-sectional structure of the connector 100 in this state. Configurations of the housing 30 and the module 40 will be first described with reference to FIGS. 5 and 6.

The housing 30 has a substantially quadrangular frame shape and has an accommodation space 31 thereinside that is open vertically. The accommodation space 31 is surrounded by four side walls 32 to 35. The side walls 32 and 33, which are in the longer sides of the quadrangular frame shape, are formed with through holes 36 in their upper end portions. The through hole 36 has an angled hole shape and communicates the inside and outside of the housing 30. In this example, six through holes 36, respectively, are aligned in an extending direction of the longer sides on each of the side walls 32 and 33. The through holes 36 are formed in mutually opposed positions on the side walls 32 and 33. Although detailed description is omitted, the housing 30 includes a lever 37 for locking to be used in mating with a mating connector.

The module 40 is composed of terminals 41 and an insulator 42. The terminals 41 are attached to ends of the cables 200 and can be connected with mating terminals of a mating connector. The insulator 42 accommodates and holds the terminals 41. In this example, the insulator 42 has four attaching holes 43 that penetrate vertically, and four terminals 41 are attached in these attaching holes 43. The terminal 41 is configured to be inserted into the attaching hole 43 from the upper side and retained as a cut-and-raised piece 41*a* of the terminal 41 is caught on a step portion 43*a* formed in the attaching hole 43. Here, a core wire 201 of the cable 200 is crimped and connected to the upper end of the terminal 41.

The outer surfaces of two mutually opposite sides of the insulator 42 are formed with spring pieces 44 that extend, respectively, along the outer surfaces. A lower end of the spring piece 44 is a fixed end and an upper end is a free end. Protruding portions 44*a*, which protrude mutually outward, are formed on the respective free ends of the two spring pieces 44, and protrusions 44*b*, which protrude mutually outward, are further formed in the vicinity of the respective free ends.

The module 40 having the above-described configuration is attached in the accommodation space 31 of the housing 30. The attachment is performed by inserting the module 40 into the accommodation space 31 from the upper side of the accommodation space 31. The module 40 is positioned and accommodated in the accommodation space 31 to be attached to the housing 30 in a manner such that the two protrusions 44*b*, which are formed on the respective two spring pieces 44, are fitted from the inside to the respective through holes 36, which are formed on the mutually opposed positions on the side walls 32 and 33. Here, a pair of the protruding portion 44*a* and the protrusion 44*b* that are formed on the spring piece 44 pinches a portion of the side wall 32 or 33 that is higher than the though hole 36 (i.e., its upper end portion), as illustrated in FIG. 6.

The module 40 is attached to the housing 30 as described above. In this example, six pairs of through holes 36, each pair of which are mutually opposed, are formed in the side walls 32 and 33 of the housing 30 and therefore, up to six pieces of modules 40 can be positioned and accommodated in the accommodation space 31 of the housing 30. Here, the drawings illustrate the state in which six pieces of modules 40 with identical specifications are accommodated, in this example. However, the number of modules 40 to be accommodated, specifications of the terminals 41 provided to the module 40, and further, specifications and the number of attaching holes 43 of the insulator 42 to which the terminals 41 are to be attached are appropriately determined depending on a specification and the number of cables 200 connected by the connector 100.

The hood 50 included in the connector 100 will now be described.

Figure 7A:
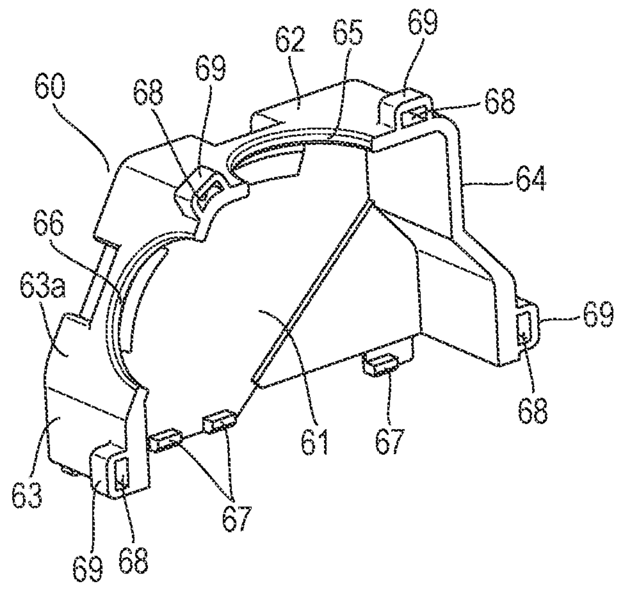
FIG. 7A is an upper perspective view illustrating one split body of a hood.
Figure 7B:
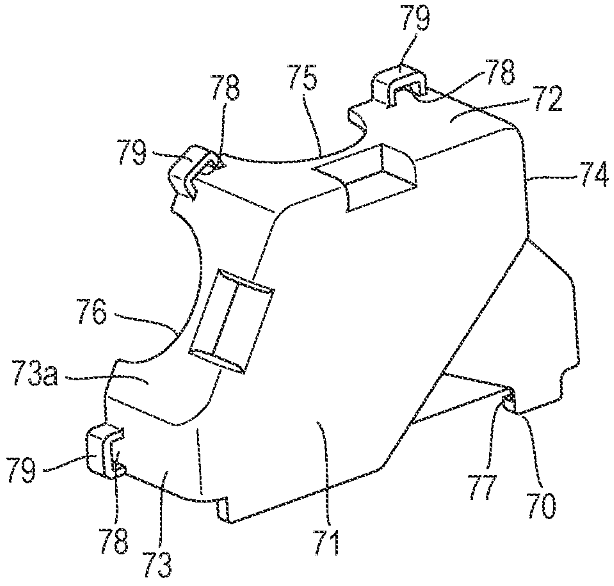
FIG. 7B is an upper perspective view illustrating the other split body of the hood.
Figure 7C:
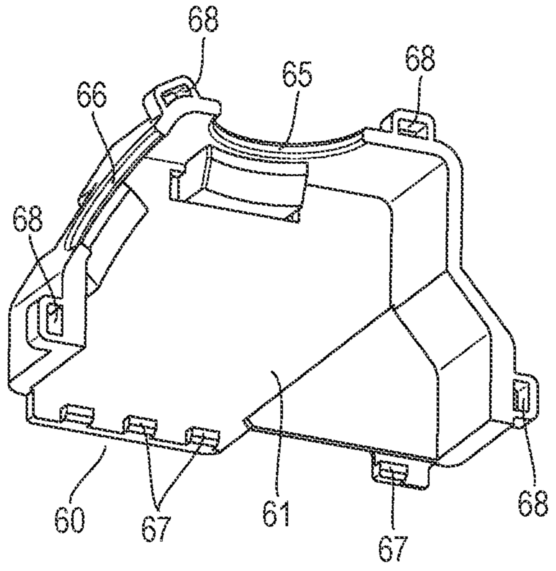
FIG. 7C is a lower perspective view illustrating one split body of the hood.
Figure 7D:
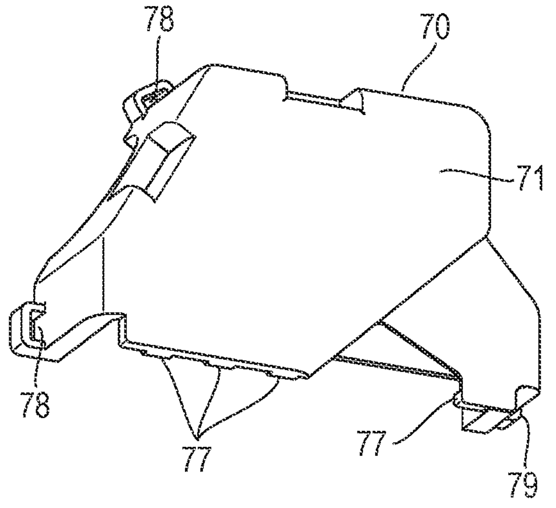
FIG. 7D is a lower perspective view illustrating the other split body of the hood.

The hood 50 is composed of two split bodies 60 and 70 that can be separated from and joined to each other. FIGS. 7A and 7B illustrate these split bodies 60 and 70 respectively, and FIGS. 7C and 7D illustrate the split bodies 60 and 70 respectively viewed in a different direction.

The split bodies 60 and 70 have mutually plane-symmetrical shapes in this example; the split body 60 constitutes a left half portion of the hood 50, and the split body 70 constitutes a right half portion of the hood 50.

The split body 60 is, mainly, composed of a side surface plate portion 61, an upper surface plate portion 62, a front surface plate portion 63, and a back surface plate portion 64. The split body 70 is similarly composed of a side surface plate portion 71, an upper surface plate portion 72, a front surface plate portion 73, and a back surface plate portion 74. On the upper surface plate portions 62 and 72 of the split bodies 60 and 70, semicircular cutouts 65 and 75 are formed respectively. The cutouts 65 and 75 form a circular hole when the split bodies 60 and 70 are abutted on each other with the side surface plate portions 61 and 71 positioned outside. In a similar manner, semicircular cutouts 66 and 76, which are to form a circular hole, are formed on inclined portions 63*a* and 73*a* of the front surface plate portions 63 and 73 respectively.

On respective lower ends of inner surfaces of the side surface plate portions 61 and 71 in these split bodies 60 and 70, projecting portions 67 and projecting portions 77 are formed so as to project mutually inward. In this example, three projecting portions 67 are formed closer to the front surface plate portion 63 and one projecting portion 67 is formed closer to the back surface plate portion 64. In a similar manner, three projecting portions 77 are formed closer to the front surface plate portion 73 and one projecting portion 77 is formed closer to the back surface plate portion 74. These projecting portions 67 and 77 can be fitted to the through holes 36, which are formed so as to be aligned and positioned on mutually opposed positions on the side walls 33 and 32 of the housing 30.

Further, bundling-band threading holes 68 and 78 are formed on the split bodies 60 and 70 respectively. The bundling-band threading holes 68 and 78 are used for fastening the split bodies 60 and 70 to each other with bundling bands. The bundling-band threading holes 68 are formed in respective four fixing portions 69 and the bundling-band threading holes 78 are formed in respective four fixing portions 79, as illustrated in FIGS. 7A, 7B, 7C, and 7D. The fixing portions 69 and the fixing portions 79 are formed on outer surfaces of the split bodies 60 and 70 in a protruded manner.

Attachment of the hood 50 will be described below.

The four projecting portions 67 of the split body 60 are fitted from the outside into the respective through holes 36, which are formed so as to be aligned on the side wall 33 of the housing 30, and, in the same manner, the four projecting portions 77 of the split body 70 are fitted from the outside into the respective through holes 36, which are formed so as to be aligned on the side wall 32 of the housing 30. The split bodies 60 and 70 are thus attached to the housing 30.

Subsequently, a bundling band 80 is threaded through each one of the bundling-band threading holes 68 of the split body 60 and corresponding one of the bundling-band threading holes 78 of the split body 70 so as to fasten the split bodies 60 and 70 to each other with the bundling bands 80. Since the split body 60 and 70 are formed with the bundling-band threading holes 68 and 78 in 4 places, respectively, they are fastened to each other with four bundling bands 80. The hood 50 is thus positioned and fixed on the housing 30, being attached to the housing 30. That is, the hood 50 comes to be in the state illustrated in FIGS. 3A, 3B, and 4.

In the state in which the split bodies 60 and 70 are fastened to each other and the attachment of the hood 50 to the housing 30 is completed as illustrated in FIGS. 3A and 3B, a straight lead-out hole 51 having a circular shape is formed by the cutout 65 of the split body 60 and the cutout 75 of the split body 70, and an angled lead-out hole having a circular shape is formed by the cutout 66 of the split body 60 and the cutout 76 of the split body 70. These straight lead-out hole 51 and angled lead-out hole have mutually-equal shapes and dimensions in this example.

The connector 100 is configured to be mated with a mating connector that is positioned underneath the housing 30. When a connecting direction between the terminals 41 and the mating terminals of the mating connector is defined as an up and down direction, the cables 200 can be led out of the hood 50 upward using the straight lead-out hole 51 formed on the hood 50, or in a direction orthogonal to the up and down direction using the angled lead-out hole. FIGS. 3A and 3B illustrate the state in which the cables 200 are led out of the hood 50 upward, and in this example, a grommet 90 is attached on the angled lead-out hole and the angled lead-out hole is closed by the grommet 90.

The example of the connector according to the present invention has been described above, and according to the connector 100 described above, following advantageous effects can be obtained.

(1) The hood 50 is attached to the housing 30 by utilizing the through holes 36 formed on the side walls 32 and 33, which are configured to be used to position and attach the modules 40. Specifically, the hood 50 is attached by using outer side portions of the through holes 36 that are not occupied by the protrusions 44*b* of the modules 40. Thus, there is no need to additively provide a special means for attaching the hood 50, and the hood 50 can be easily attached.

(2) The hood 50 is composed of two split bodies 60 and 70. The split bodies 60 and 70 are attached to the housing 30 and then fixed with the bundling bands 80 to complete the attachment of the hood 50. Thus, the attaching work can be simplified by using the bundling bands 80.

(3) The hood 50 has two holes that are the straight lead-out hole 51 and the angled lead-out hole as holes to lead out the cables 200 through. Therefore, a direction in which the cables 200 are led out can be selected depending on a using environment and a using condition of the connector 100, and further, if circumstances require, the cables 200 can be led out in both of the two directions by using both of the two holes. In that way, the connector 100 serves as a useful connector.

In the above-described example, the two split bodies 60 and 70, which constitute the hood 50, are formed with the four projecting portions 67 and 77 to be fitted into the through holes 36 of the housing 30, respectively. However, the numbers of projecting portions 67 and 77 are not limited to the above and each of the split bodies 60 and 70 may have, for example, a single projecting portion.

Further, in the above-described example, the angled lead-out hole that is not used for leading out the cables 200, is closed with the grommet 90. However, an embodiment in which the angled lead-out hole is not closed with the grommet 90 may be employed depending on a situation.

Furthermore, the bundling bands 80 are used there as the fastening means for fastening together the two split bodies 60 and 70 of the hood 50. However, the fastening means is not limited to this and the two split bodies 60 and 70 may be, for example, screwed together with screws.

Here, the connector according to the present invention includes the hood 50 having the above-described configuration, as a component. However, when the hood 50 is not necessary, a form in which the hood 50 is not attached may be employed.

The foregoing description of the embodiment of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A connector to be attached to an end of a cable and used for mating with a mating connector having a mating terminal, the connector comprising:

a housing having an accommodation space therein, the housing comprising side walls surrounding the accommodation space, the side walls having a pair of through holes formed at mutually opposed positions thereof, the housing having an inside and an outside thereof associated with the accommodation space;

a module comprising a terminal and an insulator that holds and houses the terminal, the terminal being configured to be attached to the end of the cable and capable of connecting the mating terminal, the insulator having two outer surfaces positioned at mutually opposite sides thereof, two spring pieces being provided on the two outer surfaces respectively, two protrusions being formed on the two spring pieces respectively, the two protrusions protruding mutually outward, wherein the module is attached to the housing such that the module housed in the accommodation space is positioned by fitting of the two protrusions into the pair of through holes from the inside of the housing; and a hood comprising two split bodies that are configured to be fastened to each other by a fastening means, two projecting portions being formed on the two split bodies respectively, wherein the hood is capable of being fixed to the housing in a manner such that the hood is positioned on the housing by fitting of the two projecting portions into the pair of through holes from the outside of the housing while the two split bodies are fastened to each other with the fastening means, and wherein given that a connecting direction between the terminal and the mating terminal is defined as an up and down direction, the two split bodies have shapes such that a straight lead-out hole through which the cable can be led out of the hood upward and an angled lead-out hole through which the cable can be led out of the hood in a direction orthogonal to the up and down direction, are formed in a state in which the hood is positioned and fixed on the housing.

2. The connector according to claim 1, wherein the side walls have another one or more pairs of through holes adapted for attaching another one or more modules to the housing, each of said another one or more through holes being formed at another two mutually opposed positions of the side walls.

3. The connector according to claim 2, wherein the straight lead-out hole and the angled lead-out hole have mutually-equal shapes and dimensions, and the connector further comprises a grommet that can close arbitrary one of the straight lead-out hole and the angled lead-out hole.

4. The connector according to claim 2, wherein each of the two split bodies is formed with a bundling-band threading hole, and the two split bodies can be fastened to each other by a bundling-band as the fastening means that is threaded through the bundling-band threading holes of the two split bodies.

5. The connector according to claim 1, wherein the straight lead-out hole and the angled lead-out hole have mutually-equal shapes and dimensions, and the connector further comprises a grommet that can close arbitrary one of the straight lead-out hole and the angled lead-out hole.

6. The connector according to claim 1, wherein each of the two split bodies is formed with a bundling-band threading hole, and the two split bodies can be fastened to each other by a bundling-band as the fastening means that is threaded through the bundling-band threading holes of the two split bodies.

* * * * *